UNITED STATES PATENT OFFICE.

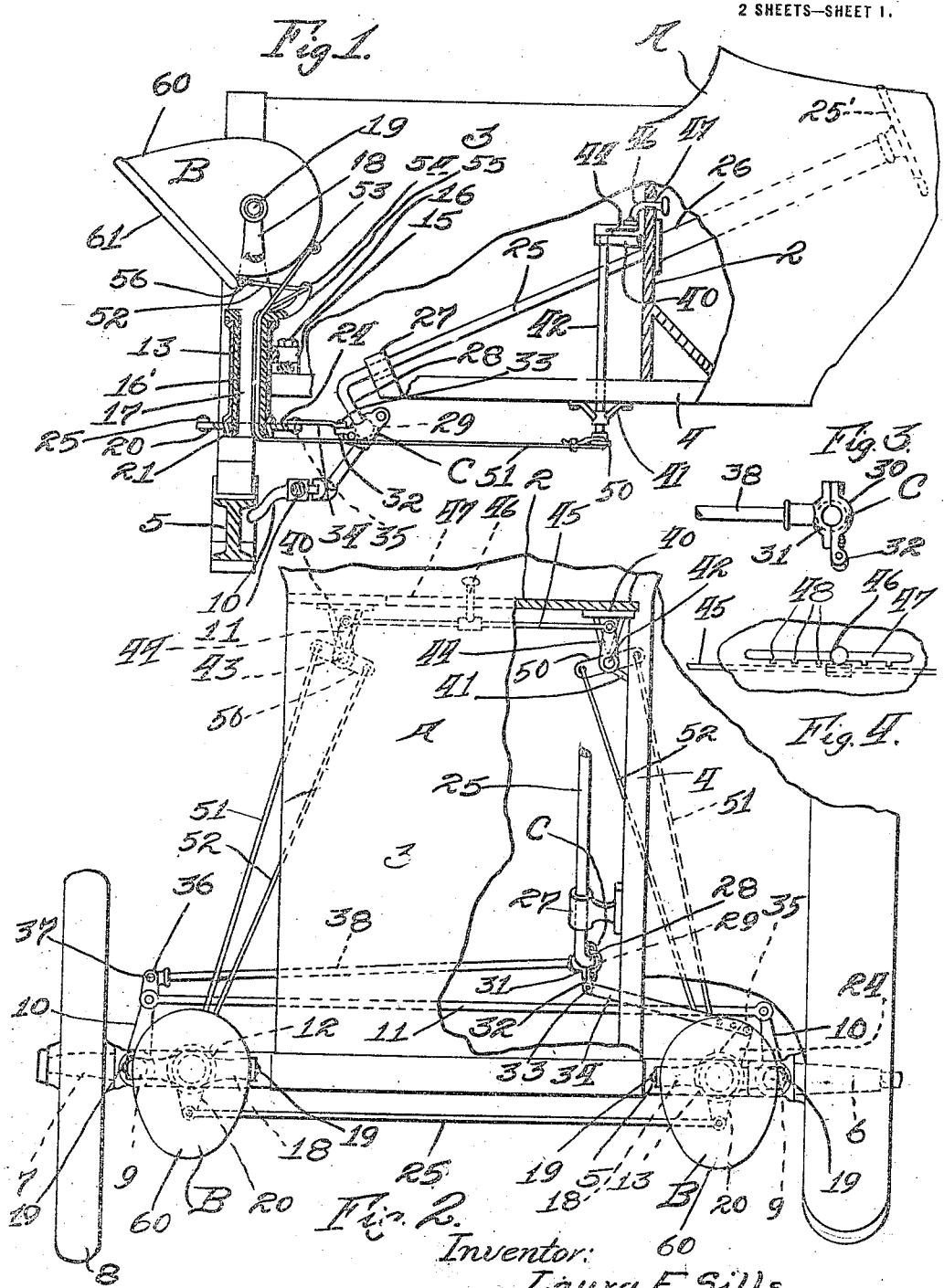

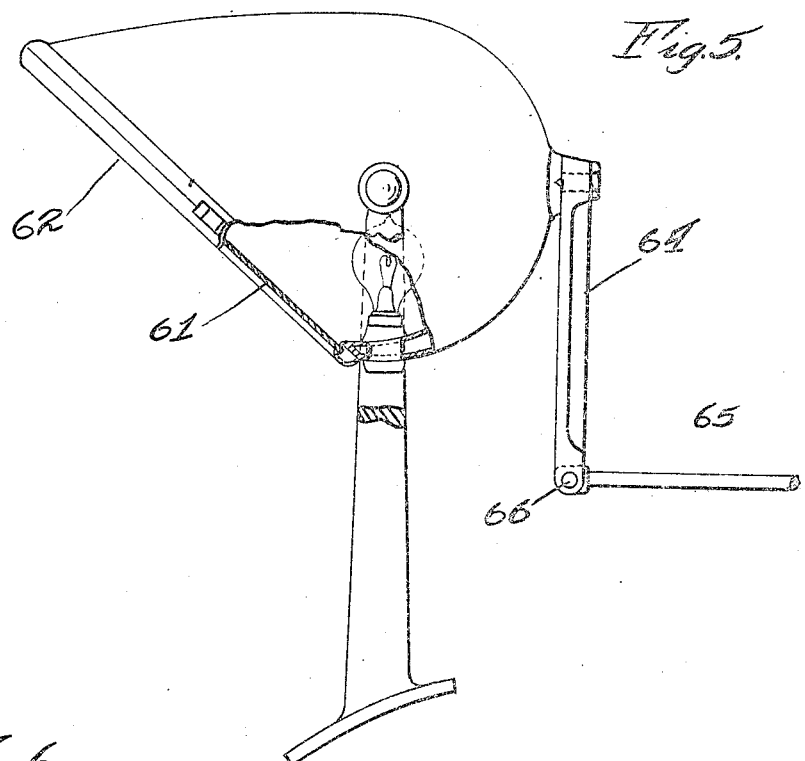
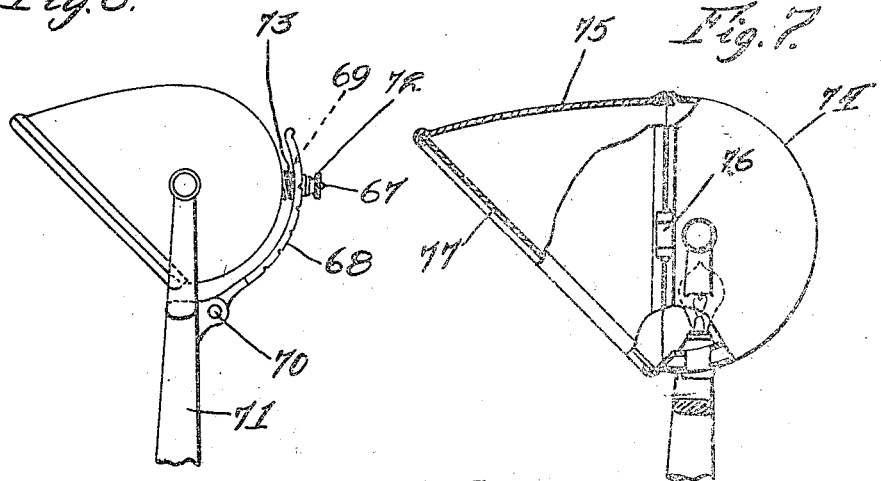

LAURA E. SILLS, OF ST. PAUL, MINNESOTA.

LAMP-DIRECTOR.

1,210,990. Specification of Letters Patent. Patented Jan. 2, 1917.

Application filed May 14, 1915. Serial No. 28,044.

*To all whom it may concern:*

Be it known that I, LAURA E. SILLS, a citizen of the United States, residing at St. Paul, in the county of Ramsey and State of Minnesota, have invented a new and useful Improvement in Lamp-Directors, of which the following is a specification.

The object of this invention is to provide improved means for turning the head lights of a vehicle in the direction in which the vehicle is being steered, and up and down so as to direct the rays of light on any portion of the road ahead desired.

A further object is to provide means for directing the lamps in the direction in which the vehicle is being steered in synchronism with the movement of the vehicle.

Another object is to provide means whereby the lamps can be tilted up and down so that the rays of light are cast directly ahead or downwardly, on that portion of the road directly ahead or downwardly in front of the vehicle, and so that the rays of light will not blind persons approaching the vehicle from in front when either on foot or riding.

A still further object is to provide simple and inexpensive construction for accomplishing the above objects.

In the accompanying drawings forming part of this specification, Figure 1 is a side elevation partly in section of a detail showing my invention applied thereto; Fig. 2 is a plan of a portion of the vehicle showing the construction illustrated in Fig. 1 applied thereto; Figs. 3 and 4 are details; Fig. 5 is a side elevation partly in section of an alternative construction of one of the lamps and part of its operating mechanism; Fig. 6 is a side elevation of an alternative construction, and Fig. 7 is a side elevation of another alternative construction.

In the drawings A designates a portion of the body of an automobile having the usual front dash 2, engine hood 3 and body frame 4. Below the body frame on the front end of the vehicle is the front axle 5 on the outer ends of which the steering wheel shafts 6 and 7 carrying steering wheels 8 are journaled, said shafts being pivoted at 9 and having the usual crank arms 10 projecting rearwardly by which the wheels are steered.

11 is the connecting rod pivoted near the outer free ends of the crank arms 10, whereby both wheels are steered together in the same direction simultaneously.

12 and 13 are spindle sockets for the lamps B which are arranged in usual position near each side of the forward end of the body, said sockets 12 and 13 being secured to the body frame 4 by means of bosses 15 and bolts 16. The spindle sockets are supported rigidly and contain the lamp carrying parts which are similar, a description of one therefore sufficing.

16' is a spindle having a longitudinal passage 17 extending vertically therethrough, the upper end of said spindle being formed with fork members 18 between which the lamp such as B is journaled by gudgeons 19 on the sides of the lamp. The lower end of the spindle is held to the spindle socket by a forwardly extending arm 20 and lock nut 21, said nut being threaded on the spindle. The arm 20 on one of the spindles 16' has a rearward extension 24. To the outer ends of the forwardly extending arms 20 on the spindles is pivotally secured a connecting rod 25, which causes the lamps to turn in their swivel supports simultaneously in the same direction.

The lamps and the steering wheels are steered in synchronism by a hand operated steering shaft 25 inclining downward from in front of the driver's seat and journaled in a support 26 mounted on the dash 2 and in a support 27 mounted on the frame 4, the upper end of said steering shaft being provided with the usual hand wheel 25' by which it is turned. The lower end of the steering shaft has a swinging arm 28 angling from the shaft and has its lower end formed with a ball bearing 29, which is revolubly held in a socket element C, composed of two members 30 and 31 bolted or otherwise secured together over the ball bearing 29. The member 30 is formed with a projecting arm 32 which is pivotally secured by a bolt 33 to one end of a pitman 34, the other end of said pitman being pivotally attached at 35 to the free end of arm 24.

Upon the rearward end of the crank arm 10 is an extension 36, to which is pivotally attached at 37 a pitman 38, said pitman being secured to the side member 31 of the ball and socket joint on the lower end of the crank arm of the steering shaft. Thus, as the steering shaft is turned, motion is imparted to the steering wheels to direct them, and to the lamps to direct them in the same direction in which the wheels are steered. For the purpose of regulating the lamps to vary the direction in which their rays extend up and down in front of the vehicle, the lamps are tilted upon their gudgeons 19 in their supporting arms 18, the tilting action being produced simultaneously on both lamps and by means of the following mechanism.

Journaled in brackets 40 secured to the dash 2 and in brackets such as 41 secured to the frame 4 are two parallel vertical shafts 42 and 43, said shafts carrying upon their upper ends laterally and rearwardly extending operating arms 44 to which are pivotally attached a connecting rod 45. This connecting rod carries an operating arm 46 secured thereto and projecting rearwardly through a horizontal slot 47 in the dash, said slot being formed with a series of notches 48, into which the arm 46 drops or springs and is held in laterally selected position. By this means the shafts 42 and 43 are turned simultaneously in their supports by shifting the operating member 46 laterally. To each of the lower ends of the vertical shafts 42 and 43 is secured a short cross arm 50, the attachment being midway between the ends of said arm and by a rigid connection whereby as each shaft is turned, the cross arm member swings about a point between the ends of the arms. To the free ends of each of said cross arm members are secured a pair of cables or flexible connections 51 and 52, one cable of said pair being attached to one end of a cross arm member and the other cable to the opposite end of said cross arm member. These flexible connections lead to the lamps B—B, one pair to one lamp, and the other pair to the other lamp, each pair of said cables leading upwardly through the passage 17 of the spindle 16 associated with the lamp to which the pair of cables leads. One of the cables of each pair such as 51 is attached directly to an eyelet 53 carried by the rearward portion of the lamp, while the other cable runs through an eye 54 on a guide arm 55 formed integral with and extending rearwardly from the spindle and is fastened to an eyelet 56 distanced forwardly from the eyelet 53 on the lower surface of the lamp, the arrangement of the connections being so that as the shafts 42 and 43 are turned, the arms 50 cause the cables to tilt the lamps up and down. It will be noted that by running these cables upwardly through the spindles, the means for tilting the lamps up and down does not prevent the movement of the lamps in synchronism with the steering movement of the steering wheels and vice versa, the steering of the lamps laterally does not effect the means for tilting the lamps up and down.

The construction of the lamps may be variously modified, it being preferred that the construction be such as to provide an extension shade 60 projecting forwardly and having a downwardly and rearwardly slanting transparent face 61 throwing the light rays down on the road, so as to obscure the direct rays of light from the eyes of the person who is approaching the vehicle from in front. By tilting the lamps up and down, the rays can be directed in any desired position downwardly upon the road.

The lamp as illustrated in Fig. 5 is shown with a hinged door 62, which swings downwardly and holds the transparent face 61. In the construction of lamp illustrated in Fig. 5 a modified form of tilting means is illustrated, a depending arm 64 being secured rigidly to the rear portion of the body of the lamp and an operating arm 65 extending rearwardly and being pivotally attached at 66 to the depending member 64, whereby through the reciprocation of the arm 65, the lamp is tilted either upwardly or downwardly in its support. In Fig. 6 another modified form of mechanism for tilting the lamp is illustrated, the rearward portion of the body of the lamp being shown by the stud bolt 67 and a curved notched arm 68 having a longitudinal slot 69 being hinged at 70 to the support 71, whereby as the lamp is tilted the bolt 67 slides freely in the slot 69. A thumb nut 72 on the bolt 67 is adapted to clamp the lamp to the arm 68 and hold the lamp in any tilted position desired. A coil spring 73 passing around the bolt 67 and interposed between the back of the lamp and the holding arm 68 acts as a cushion against which the arm 68 is clamped by the thumb nut. In this construction the lamp can be set in any tilted position desired, but cannot be changed in position from the driver's seat. In the construction illustrated in Fig. 7 the lamp body 74 is provided with a detachable shade 75, which is hinged at 76 thereto. The front portion of said shade being provided with a transparent front 77 which is secured rigidly therein in downwardly and rearwardly inclined position. These various forms of lamps are all applicable for use with my invention, the particular construction thereof being adapted to assist in most effectively directing the rays of light down upon the road.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention what I claim as new and desire to protect by Letters Patent is:

1. In combination with a motor vehicle including a lamp, a standard having forks between which the lamp is swiveled and adapted to turn about a vertical exis, means for turning the vertical standard and lamp, a vertical rod journaled upon the vehicle, a connection between said rod and said lamp, and means horizontally movable for turning said rod to tilt said lamp vertically between said forks.

2. In combination with a motor vehicle including a lamp and having a dash provided with a horizontal slot, a standard having forks between which the lamp is swiveled for vertical movement, a vertical rod journaled upon the vehicle, a connection between said rod and said lamp, and means slidable within said slot having a connection with said rod for turning the same to tilt said lamp between said forks.

3. In combination with a motor vehicle including a lamp and having a dash provided with a horizontal slot, a standard having forks between which the lamp is swiveled for vertical movement, a vertical rod journaled upon the vehicle in proximity to the dash, a connection between said rod and said lamp, and means slidable within said slot having a connection with said rod for turning the same to tilt said lamp.

4. In combination with a motor vehicle including a lamp and having a dash provided with a horizontal slot formed with a serrated edge, a standard upon which the lamp is tiltingly mounted, a vertical rod journaled upon the vehicle, a flexible connection between said rod and said lamp, and a crank handle slidable within said slot having a connection with said rod for turning the same to tilt said lamp and adapted to be retained in selected position by engagement with said serrated edge.

5. In combination with a motor vehicle including a pair of lamps, a dash provided with a horizontal slot formed with a serrated edge, a pair of standards upon each of which one of said lamps is tiltingly mounted, a pair of vertical spaced rods journaled upon said vehicle, a flexible connection between each of said rods and a lamp, means rotatably connecting said rods, and a crank handle slidable within said slot engaging said rotating means to tilt said lamp and adapted to be retained in selected position by engagement with said serrated edge.

In testimony whereof, I have signed my name to this specification in the presence of two subscribing witnesses.

LAURA E. SILLS.

Witnesses:
STELLA L. WASCHENBERGER,
F. S. BRADBURY.